April 15, 1958 — J. F. TATUM — 2,830,616
AUTOMATIC PRESSURE BOOSTER
Filed July 27, 1954 — 3 Sheets-Sheet 3
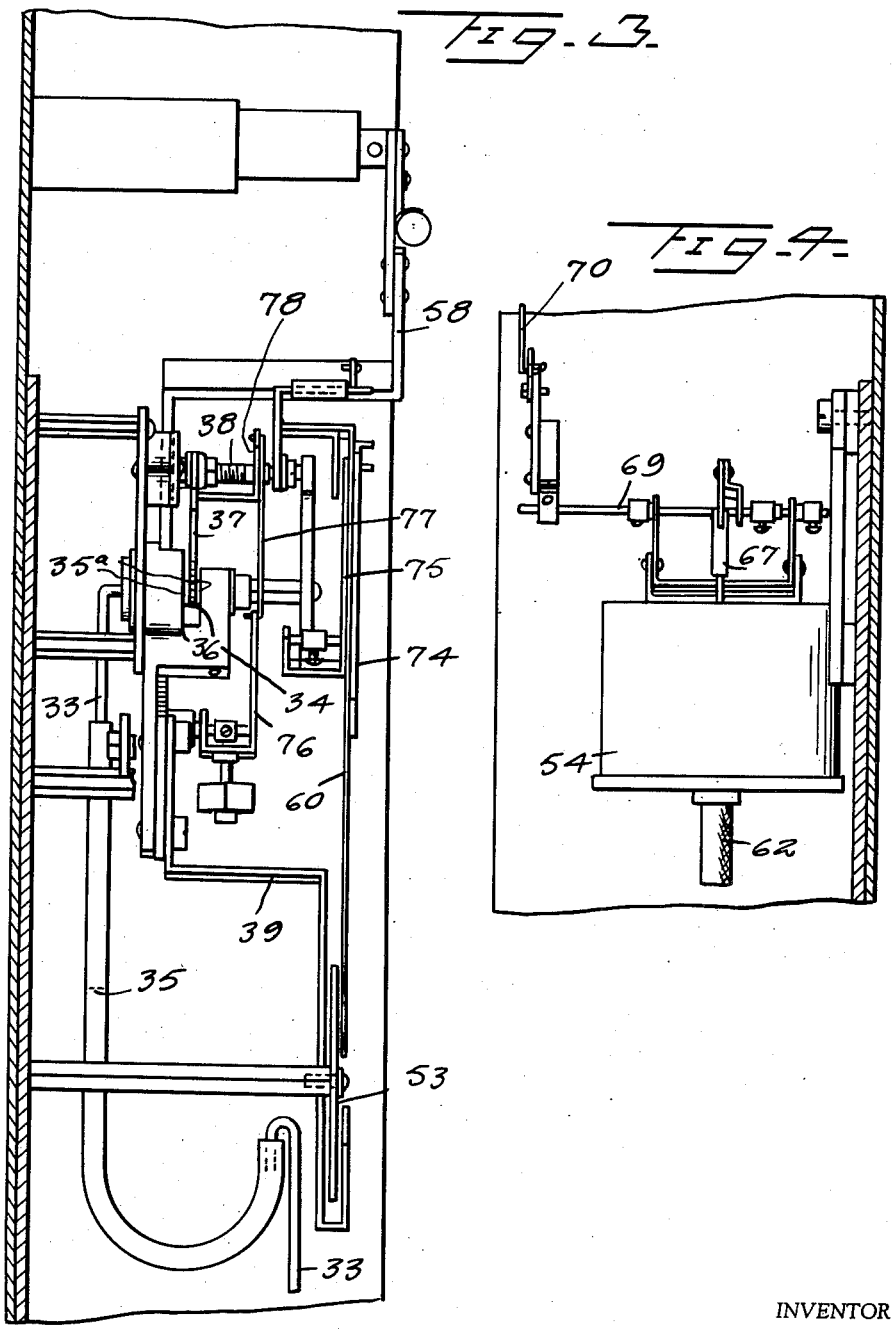
INVENTOR
J. F. Tatum
BY Kimmel & Crowell
ATTORNEYS United States Patent Office 2,830,616
Patented Apr. 15, 1958

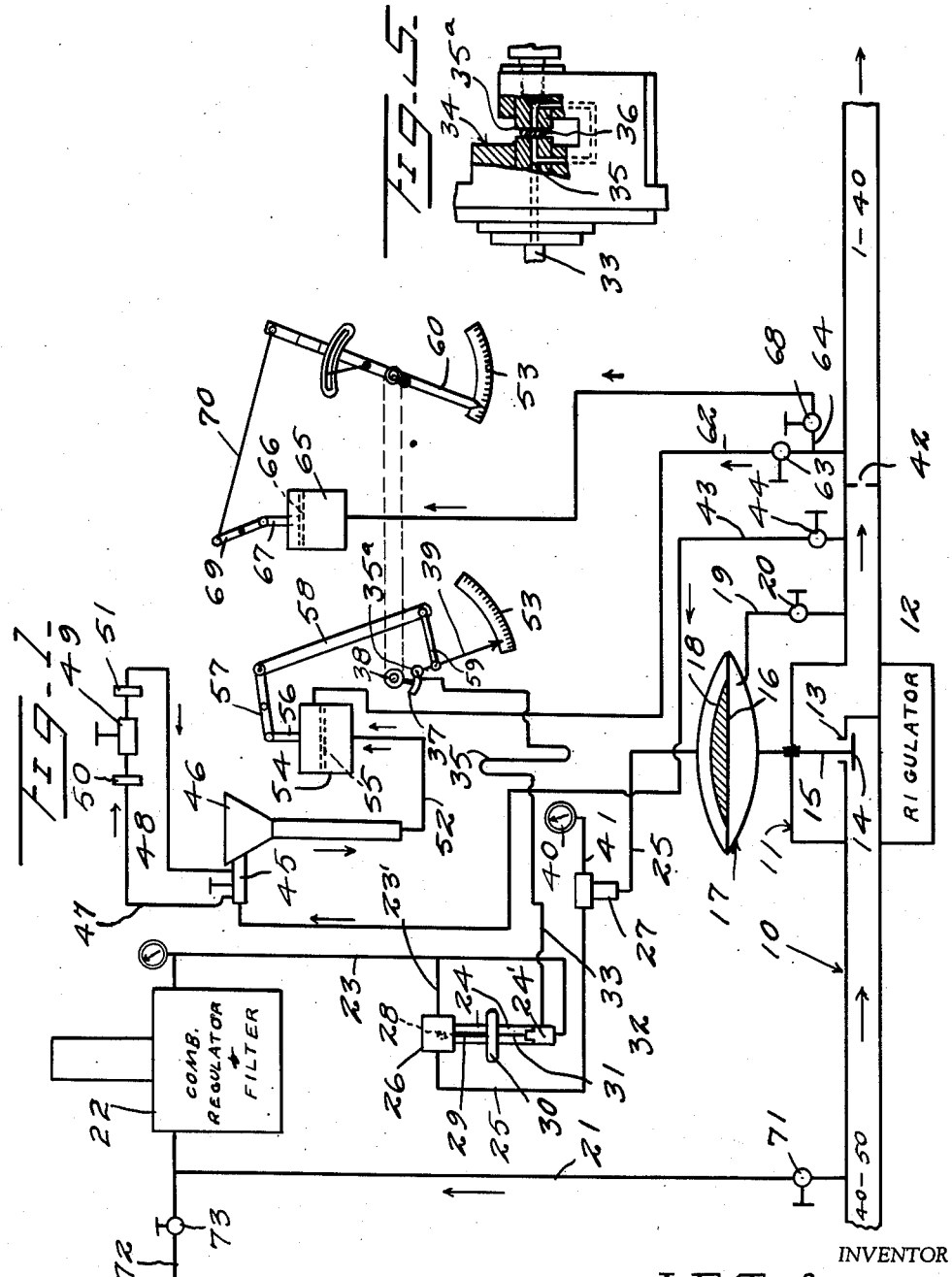

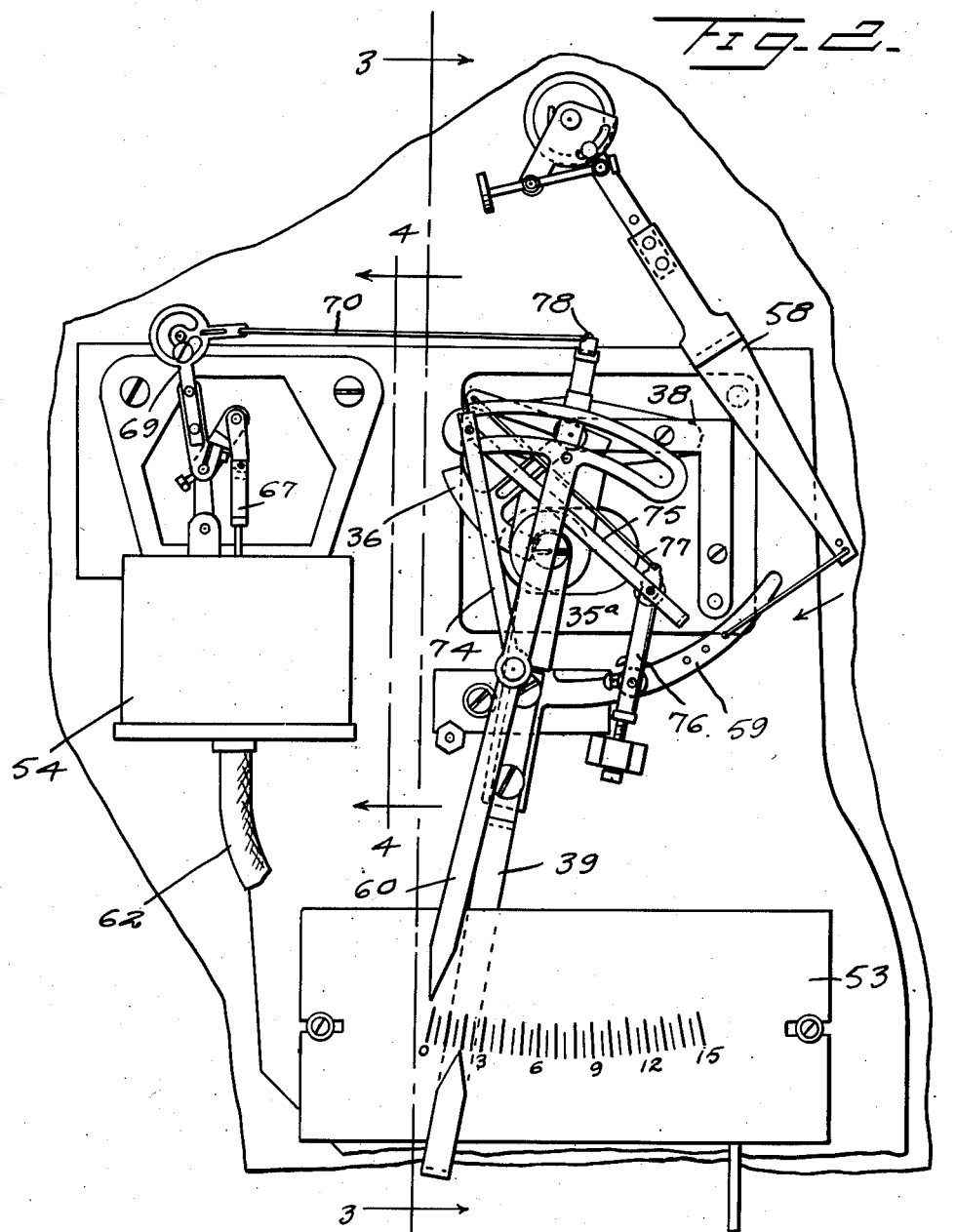

2,830,616

AUTOMATIC PRESSURE BOOSTER

Joseph F. Tatum, Hattiesburg, Miss.

Application July 27, 1954, Serial No. 446,028

3 Claims. (Cl. 137—484.2)

This invention relates to means for raising or lowering the inlet pressure on any fluid carrying line so as to compensate for friction losses in the line in order to maintain a certain minimum pressure at the discharging end. This is accomplished by placing an orifice in the fluid carrying line and interpreting the pressure head developed across this orifice in terms of the friction drop in the line. The pressure drop or increase is interpreted by the pressure booster and inlet pressure is raised or lowered a sufficient amount by means of a regulator to offset the drop or rise, thereby maintaining an even pressure at the end of the line.

A further object of this invention is to create a pressure boosting instrument that may be applied to any currently utilized pressure regulating means.

A still further object of the present invention is to provide an anti-hunt mechanism in the pressure boosting instrument in order to prevent surging or rapid fluctuations in the outlet pressure. The anti-hunt mechanism is fully adjustable to meet the time constant requirements of any line.

A still further object of this invention is to provide an adjustable stop in the pressure boosting instrument to enable the carrying of a minimum safe pressure.

Other and further objects and advantages of the instant invention will become more apparent from a consideration of the following specification when read in the light of the annexed drawings, in which:

Figure 1 is a diagrammatic view of a pressure booster constructed in accordance with the teachings of the instant invention;

Figure 2 is a fragmentary front elevation of the indicating means associated with this invention;

Figure 3 is a cross-sectional view, partly in elevation, taken on the vertical plane of line 3—3 of Figure 2, looking in the direction of the arrows;

Figure 4 is a fragmentary cross-sectional view, partly in elevation, taken on the vertical plane of line 4—4 of Figure 2; and Figure 5 is an enlarged side elevation detail view, partly in section showing the nozzle housing and confronting vanes and the swingable vane.

Referring now more specifically to the drawings, reference numeral 10 designates, in general, a fluid pressure line, such as a gas line. Line 10 has interposed therein a diaphragm operated regulating valve structure designated, in general, by the reference numeral 11.

The valve structure 11 embodies a housing 12 having a valve seat 13 disposed therein, and a valve 14 engageable on the seat 13. A valve stem 15 projects upwardly through the top of the housing 12, and is connected at its upper end to a flexible diaphragm 16 mounted in a diaphragm housing 17.

A weight 18 is mounted on the upper side of the diaphragm 16 and constantly urges the valve 14 downwardly to open position.

A pipe 19 is connected at one end to the line 10 on the discharge side of the valve housing 12, and is connected at the other end to the diaphragm housing 17 on the lower side of the diaphragm 16. A valve 20 is interposed in the pipe 19.

A pipe 21 is connected at one end to the line 10 on the intake side of the valve housing 12, and the pipe 21 has interposed therein a combined regulator and filter 22 of conventional construction, which discharges through a pipe 23 to the inlet side of a three-way valve 24, and through the branch pipe 23' into the outlet side of the valve.

The valve structure 24 includes a capsule or wafer operated valve element 28 which is connected by means of a stem 29 to one side of a hollow, expandable wafer 30. A pipe 31 connects the other side of the wafer 30 with the inlet side of the valve 24, which is also provided with a fixed orifice 24' for feeding a constant amount of gas or air to the wafer 30.

A pipe 25 controlled by the valve element 28, connects from the outlet side of the valve 24 through one side of a T-connector 27 to the upper side of the diaphragm housing 17.

A pipe 33 is connected at one end to the inlet side of the valve 24 adjacent the lower end of the pipe 31, and the opposite end of the pipe 33 is connected to a nozzle housing structure, generally indicated at 34 (see Figure 5). Flexible tubing 35 is interposed in the pipe 33 adjacent the nozzle housing 34.

The nozzle housing 34 is formed with a pair of confronting nozzles 35a between which an arcuate vane 36 oscillates. The vane 36 swings between the nozzles 35a and in so doing acts to increase or decrease the back pressure in the pipe 33 and in the wafer 30, so as to effect a corresponding movement of the valve element 28 to either open or closed position. The arcuate vane 36 is carried by a rock arm 37 mounted on one end of a rock shaft 38 having a pointer 39 connected at the other end thereof.

A pressure gauge 40 is connected by means of a pipe 41 with the T-connector 27, so that the pressure of the gas or fluid on the upper side of the diaphragm 16 may be readily determined.

The line 10 on the discharge side of the housing 12, and outwardly beyond the connection of pipe 19 with line 10, has disposed therein an orifice 42. This orifice may be constructed in the form of an apertured plate or of an adjustable valve which will provide for a reduced opening beyond the valve 11.

One end of a pipe 43 is connected to the line 10 between the orifice 42 and the pipe 19, and has the other end thereof connected to a valve structure 45 which is secured to a mercury receptacle 46, the gas or air flow through the pipe 43 being controlled by a valve 44 interposed therein.

A needle valve 49 is interposed in the pipe 47, and a pair of filters 50 and 51 are positioned on opposite sides of the needle valve 49. The valve 49 is utilized to even out the pressure of the fluid which enters the mercury receptacle 46, so that the mercury in the receptacle 46 will not be subject to surging under rapid outlet pressure changes.

One end of a pipe 52 is connected with the lower end of the mercury receptacle 46 and has its other end connected to the lower end of a mercury float chamber 54, provided with an iron float 55 adapted for reciprocation therein. One end of a connecting rod 56 is fixedly secured to the float 55 and has its other end pivotally connected to one end of a rock lever 57.

The other end of the rock lever 57 is pivotally connected to one end of a long lever arm 58 having its other end connected to one end of a link 59, the other end of the latter being connected with the pointer 39, so that the free end thereof moves over a scale bearing member 53. As is best seen in Figure 3, the nozzles 35a are mounted on the pointer 39 for movement therewith. A means is provided to adjust the ratio of movement of the nozzle structure 34 with respect to the mercury float 55.

A pipe 62 having a valve 63 interposed therein has one of its ends connected to the line 10 beyond the orifice 42 and the other end thereof is connected to the mercury chamber 54 above the float 55. Thus the pointer 39 moves over the scale member 53 in response to the pressure drop across the orifice 42 as interpreted by the mercury level in the chamber 54 and the movement of the kinematic means associated therewith as described above, and the amount of pressure needed in the line 10 is indicated thereby.

Intermediate the valve 63 and the line 10 one end of a pipe 64 is connected to pipe 62, and its other end is connected to a chamber 65 having a metal bellows 66 mounted for reciprocation therein.

A connecting rod 67 has one of its ends fixedly connected with the bellows 66 and its other end pivotally connected to one end of a pivoted rock lever 69. The other end of the rock lever 69 is pivotally connected to one end of a link 70 which has its other end pivotally connected to one end of a pointer 60, secured for rotation with the rock shaft 38, and having its free end sweeping across the dial or scale 53 to indicate the pressure of the gas or air beyond the orifice 42.

In the event the fluid in the line 10 is a liquid, a separate source of air or gas (not shown) is connected through the pipe 72, controlled by valve 73, to the inlet side of the combined regulator and filter 22. In this case, the valve 71 interposed in the pipe 22 would be actuated to its closed position.

Conventional link members 74, 75, 76, 77 and 78 are connected between the pointer 60 and the instrument, to provide a setting arrangement so as to proportion the position of the free vane 36. This proportioning means enables the setting of the motion of the vane in proportion to the pointer 60 of substantially 15 percent. Also, in the setting of the pivot point of the above-described linkage to either side of pointer 60, means are provided to read either a direct or indirect control action relative to pressure fluctuations as sensitized by pressure means. This enables the use of the instrument as either a direct or indirect action regulating means of conventional construction. In Figure 1, the linkage is so arranged as to obtain a direct action regulating means in the valve 11.

In operation, and assuming that there is no pressure in line 10, the valve 14 is unseated and is moved to its open position under the influence of the weight 18.

When air or gas under pressure is applied to the line 10, the flow takes place in the direction of the arrows, as indicated in Figure 1, and passes through the valve seat 13. The regulator will automatically close because of the pressure under the diaphragm 16 from pipe 19 until the amount of the gas or air passing through the seat 13 equals the flow and effects a pressure through the pipe 19 to the under side of the diaphragm 16 which offsets the weight 18. As the load or flow increases in line 10, the pressure at the end thereof must drop because of the friction losses in the line. Compensation of this loss comprises one of the principal objects of this invention and to that end means are provided for maintaining a constant pressure at the remote end of the line 10. In order to accomplish this object, air or gas is supplied to the regulator 22 at a pressure of ten or more p. s. i.

The pressure from the regulator 22 is raised or lowered by the valve wafer 30 which is, in turn, controlled by the position of the vane 36 with respect to the nozzles 35a, and impressed on the top of the diaphragm 16. This, of course, raises or lowers the outlet pressure of the regulator 11.

The nozzles 35a are positioned by the mercury float 55, the float rising or falling with the level of the mercury in the mercury receptacles 46 and 54. The level of the mercury in these receptacles is determined by the pressure drop across the orifice 42 imposed in the line 10.

The position of the vane 36 between the nozzles 35a is controlled by the bellows 66 in the receptacle 65.

As the mercury level raises, the position of the nozzles 35a is moved up scale. This, in turn, effects a decrease in the pressure on the wafer 30, since the nozzles 35a move away from the vane 36. Subsequently, the valve 24 acts to increase the pressure on the diaphragm 16, effecting an opening of the valve 14 whereby the pressure on the downstream side of the regulator 11 is increased. As a consequence of this increase in pressure, the bellows 66 operates, through the aforedescribed linkage, the indicator 60, moving the latter up scale together with the vane 36. The vane 36 moves back in between the nozzles 35a until an equilibrium point is established.

As the regulator 11 opens, the pressure on the upstream side of the orifice 42 is increased, again effecting movement of the nozzles 35a, setting up a hunting action. This condition is overcome by the anti-hunt needle valve 49, which acts to slow down the response of the pressure on the high side of the mercury column 46 until a steady state set condition is reached which reflects the true load condition.

The mercury chamber 46 is shaped so as to allow for a greater mercury area at the low ranges to increase the sensitivity of the response at low flows. In this connection, the chamber 46 is substantially funnel-shaped to accomplish this purpose.

Having described and illustrated one embodiment of this invention, it will be understood that the same is offered merely by way of example, and that the invention is to be limited only by the scope of the appended claims.

What is claimed is:

1. An automatic fluid pressure booster for a fluid pressure pipe line comprising an orifice disposed in said line, a valve mounted in said line on one side of said orifice, pressure responsive means for actuating said valve, a pipe having one of its ends connected to said line between said valve and said orifice, the other end of said pipe connecting to one side of said pressure responsive actuating means, a second pipe having one of its ends connected to said line on the other side of said valve and its other end connected to the other side of said first pressure responsive actuating means, a valve connected in said second pipe, a second pressure responsive valve actuating means connected with said second valve, a pipe connected between said second pipe and one side of said second pressure responsive valve actuating means, a bleeder pipe having one of its ends connected to said one side of said second pressure responsive valve actuating means, the other end of said bleeder pipe terminating in a pair of opposed nozzles, a third pressure responsive actuating means, a pair of pipes each connecting on opposite sides of said third pressure responsive actuating means, respectively, and with said line on opposite sides of said orifice, a fourth pressure responsive actuating device, a pipe connecting one side of said fourth pressure responsive device with said line on the side of said orifice opposite said first named valve, and means operably connected to said third and fourth pressure responsive actuating devices for movement between and relative to said nozzles, said last named means reacting to said third and fourth pressure responsive means causing relative movement of said last named means with respect to said nozzles which varies the back pressure in said bleeder pipe effecting the operation of said second pressure responsive means to move said second valve to its open or closed position whereby fluid in said second pipe is transmitted or cut off from said first pressure responsive actuating device to move said first valve to its open or closed position.

2. An automatic fluid pressure booster device as defined in claim 1, and means connected in said pipe connecting said third pressure responsive actuating means with said one side of said orifice for damping surges of fluid pressure therein.

3. An automatic fluid pressure booster for a fluid pressure pipe line comprising an orifice disposed in said line, a valve mounted in said line on one side of said orifice, pressure responsive means for actuating said valve, a pipe having one of its ends connected to said line between said valve and said orifice, the other end of said pipe connecting to one side of said pressure responsive actuating means, a second pipe having one of its ends connected to said line on the other side of said valve and its other end connected to the other side of said first pressure responsive actuating means, a valve connected in said second pipe, a second pressure responsive valve actuating means connected with said second valve, a pipe connected between said second pipe and one side of said pressure responsive valve actuating means, a bleeder pipe having one of its ends connected to said one side of said second pressure valve actuating means, the other end of said bleeder pipe terminating in a pair of opposed nozzles, a third pressure responsive actuating means for actuating said second valve, said third pressure responsive actuating means comprising a pair of mercury chambers disposed in vertical position and of which one of said chambers is substantially funnel-shaped in configuration and the other cylindrical in shape, a conduit connecting said chambers adjacent the lower ends thereof, a pair of pipes each connecting on opposite sides of said third pressure responsive actuating means, respectively, and with said line on opposite sides of said orifice, a fourth pressure responsive actuating device, a pipe connecting one side of said fourth pressure responsive device with said line on the side of said orifice opposite said first named valve, and means operably connected to said third and fourth pressure responsive actuating devices for movement between and relative to said nozzles, said last named means reacting to said third and fourth pressure responsive means causing relative movement of said last named means with respect to said nozzles which varies the back pressure in said bleeder pipe effecting the operation of said second pressure responsive means to move said second valve to its open or closed position whereby fluid in said second pipe is transmitted or cut off from said first pressure responsive actuating device to move said first value to its open or closed position.

References Cited in the file of this patent

UNITED STATES PATENTS

| | | |
|---|---|---|
| 2,182,873 | King | Dec. 12, 1939 |
| 2,286,188 | MacLean | June 16, 1942 |
| 2,365,713 | MacLean | Dec. 26, 1944 |